Patented Nov. 1, 1927.

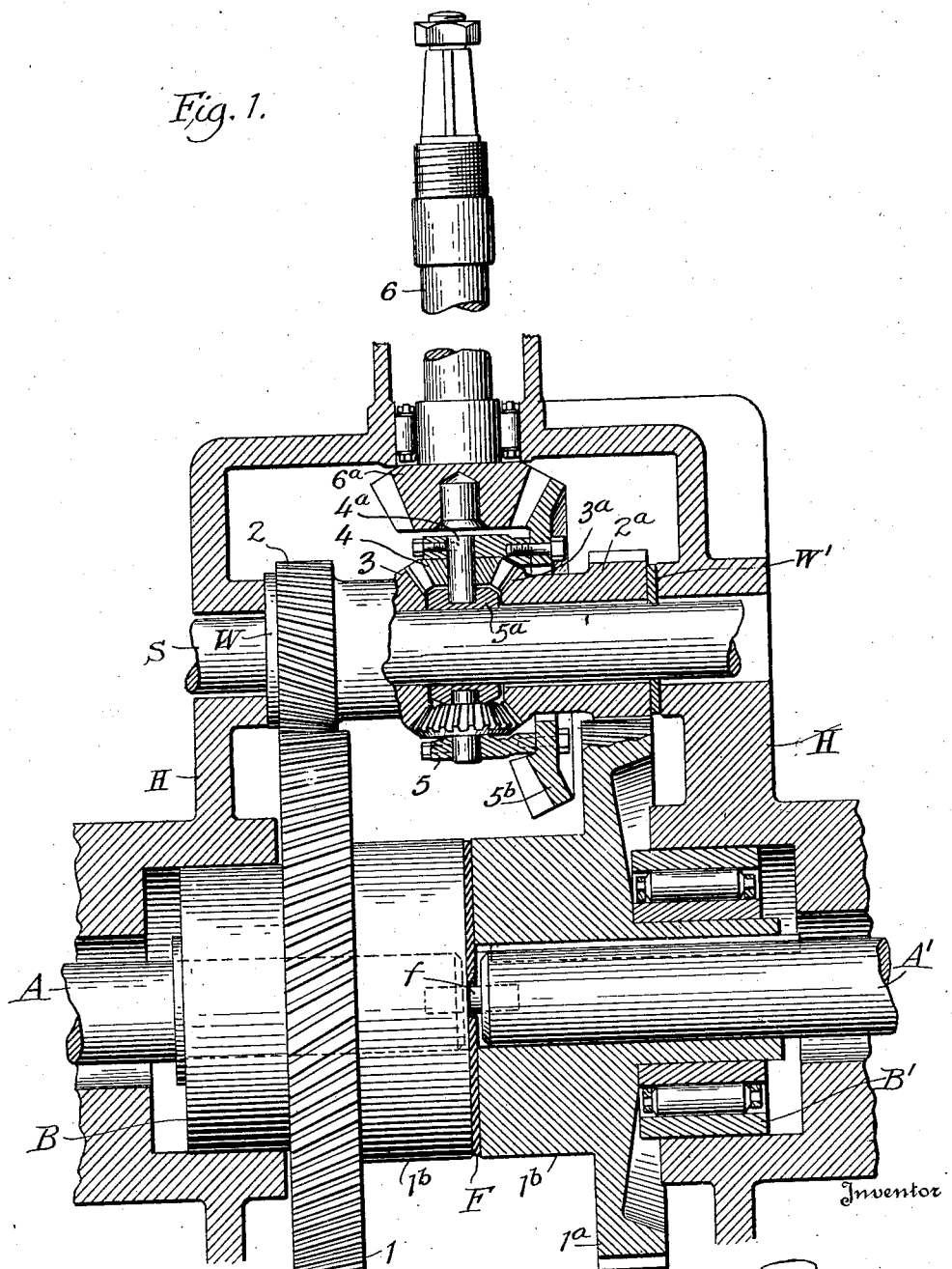

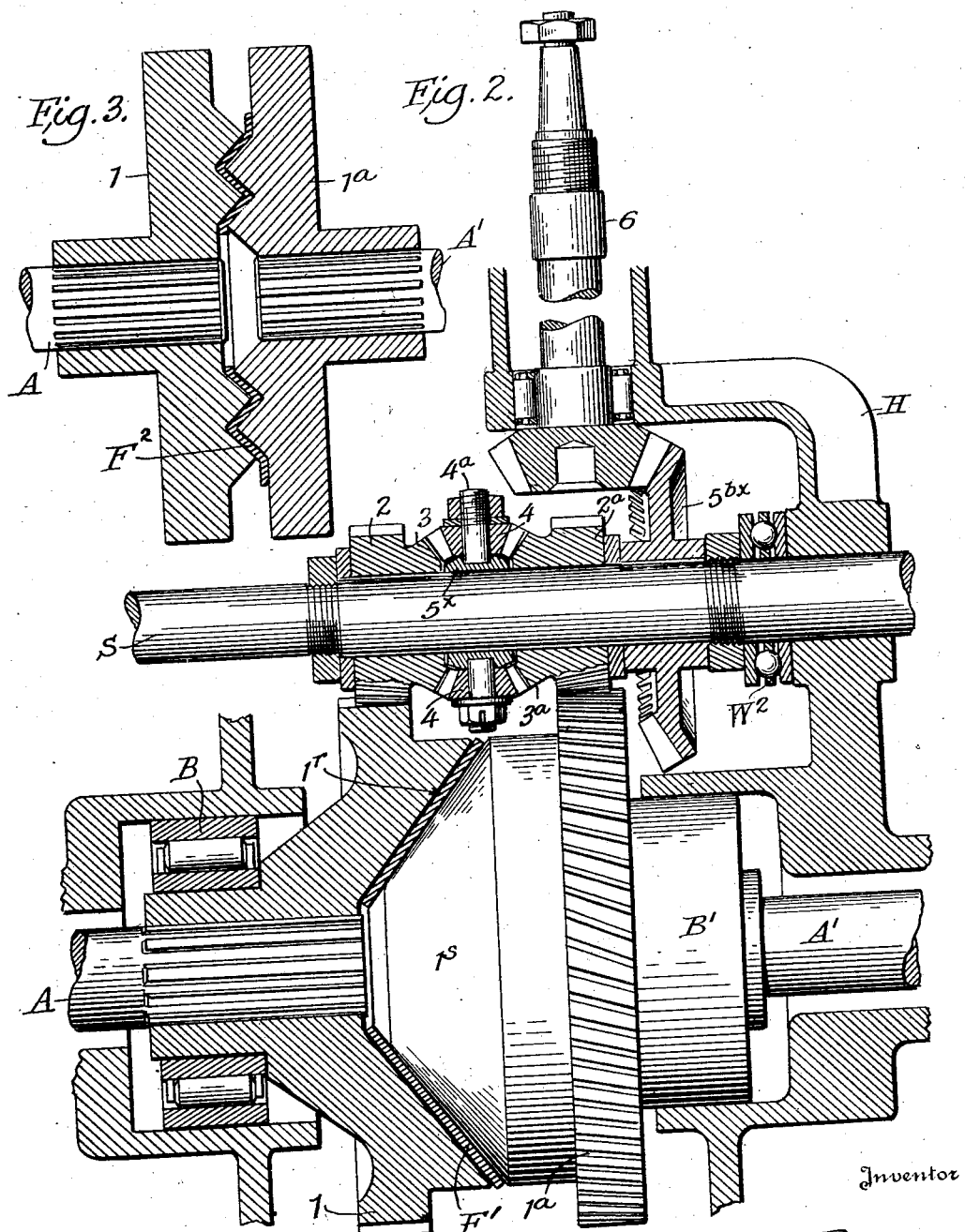

1,647,750

UNITED STATES PATENT OFFICE.

DAVID E. ROSS, OF LA FAYETTE, INDIANA.

DIFFERENTIAL GEARING.

Application filed February 18, 1926. Serial No. 89,104.

This invention is an improvement in differential gearing for use in the power transmission mechanism of motor-driven vehicles. The object of the invention is to provide a differential gear having helical transmission gears and a frictional element between the driven members to partially interlock them on the straight-away forward drive, such frictional element being engaged on the forward drive by reason of the endwise thrust on the driven members due to the angles of the teeth of the intermeshing helical gears.

In my transmission I use opposed helical pinions and compensating gearing between the helical pinions thereby obtaining the advantages of a herringbone transmission; and utilize the thrust of the helical gears driven by said pinions to thrust the driven members toward each other, without the use of springs, and thereby partially interlock the driven members to cause them to turn as a unit. At all times in a straight forward drive the driven members are held or pressed together by the thrust on the driven members due to the angle of the helical teeth. Preferably I employ a friction element between the driven members to enhance the friction.

In the forward drive the driven members are continually thrust toward each other and before either member could "race" it would have to overcome a coefficient of friction multiplied by the force of the thrust on the gears caused by their helical teeth. In other words before either driven member can spin the resistance of the frictional interlocking means between the two driving members must be overcome. The construction however does not interfere with the backward movement of the vehicle and permits the necessary differential speeds of rotation of the drive members in turning; but will tend to prevent racing of one drive wheel relative to the other in case one driving wheel should drop into mud or sand while the other wheel is on hard ground, the driven member on the shaft section carrying the idle wheel being bound or clutched (as described) to the driven member on the other shaft section, the power which would ordinarily be wasted in racing the idle wheel is transmitted to the shaft section carrying the wheel having traction.

I will explain the invention with reference to the accompanying drawings which illustrate practical embodiments of the invention, and an understanding thereof will enable others familiar with the art to adapt and use the invention. In the claims I have summarized the essentials of the invention and novel features of construction and novel combinations of parts for which protection is desired.

In said drawings—

Figure 1 is a sectional view of one form of differential gearing embodying the invention with some of the parts shown in elevation.

Fig. 2 is a similar view of a modified form thereof.

Fig. 3 is a detail of another modification.

In the drawings A and A' represent opposite alined axle sections of ordinary constructions, the inner ends of which are suitably mounted in the housing H which may be of any suitable or desirable construction and is merely conventionally illustrated in the drawings.

In the construction shown in Fig. 1, opposed helical or spiral gears 1, 1ᵃ are fixedly mounted on the inner ends of the axle sections A, A', and may be also journaled in suitable bearings in the housings H; roller bearings B, B', being indicated in the drawings. The gears 1, 1ᵃ are respectively right and left helical gears, of similar size, their teeth being angularly inclined in opposite directions. The gears 1, 1ᵃ preferably have enlarged hub portions 1ᵇ on their inner opposed faces, which run close together and may be adapted to contact. Preferably suitable clutch devices are inserted between the adjacent ends of the hubs 1ᵇ; a friction clutch disk F being shown, which disk may be supported between the hubs in any suitable manner, as by means of a pin $f$ (Fig. 1) transfixing disk F, and engaging adjacent sockets in the opposite ends of the axle sections A, A'.

The gear 1 engages and meshes with a spiral or helical pinion 2, shown as mounted on the usual jack-shaft S arranged parallel with the axle sections and mounted in the housing H in the usual manner. The gear 1ᵃ meshes with a similar helical pinion 2ᵃ on said jack-shaft; both pinions 2, 2ᵃ being preferably rotatable on said shaft.

The pinion 2 has a bevel gear 3 on the inner end of its hub; and pinion 2ᵃ has a bevel gear 3ᵃ on the inner end of its hub. The bevel gears 3, 3ᵃ mesh with interposed idle compensating gears 4, rotatably mounted on a spider or ring 5 which, as shown in Fig. 1, is rotatably mounted on shaft S between the gears 3, 3ª. To ring 5 is connected a bevel gear 5ᵇ, that meshes with a driving pinion 6ª on the driving shaft 6, which shaft is driven from the vehicle motor in the usual manner.

If desired, anti-friction members may be interposed between the outer ends of the pinions 2, 2ª and the adjacent sides of the housing H. These members may be washers W, W' as in Fig. 1; or ball races W², as indicated in Fig. 2.

With the construction described, when gear 5ᵇ is driven uniformly and the vehicle is moving straight forward, the helical pinions 2, 2ª will also be uniformly rotated and impart a uniform speed of rotation in the same direction to the gears 1, 1ª, and the shaft section A, A'. If the vehicle is turned to right or left the compensating gears 4 will permit the desired differential rotation of the gears 1, 1ª to axle section A, A', as is common in differential gearing. The helical teeth on the gears 1 and 2 and 1ª, 2ª are relatively so angularly disposed that the cam action between the teeth of said pinions and gears will tend to force the helical gears 1, 1ª toward each other.

If, on straight forward driving, the wheel on either of the axle sections should drop into mud or sand so as to lose its traction, the power which would be ordinarily exerted to race the tractionless wheel is transmitted by the clutch or friction devices between gears 1, 1ª, to the wheel having traction; and the resistance of said clutch or friction devices would have to be overcome before either wheel could "race".

In the construction shown in Fig. 2, the gear 1 is provided with a conical recess 1ʳ in its inner end adapted to be engaged by a conical projection 1ˢ on the hub of the gear 1ª. Also in the construction the gears 2, 2ª are loosely mounted on the jack shaft S, the spider 5ˣ carrying the compensating gears is keyed to the jack shaft, and the gear 5ᵇˣ is also keyed to the jack shaft. This construction will operate as above described both in straight driving, and in turning, and should either wheel lose its traction, will prevent or reduce racing thereof and transmit the power to the wheel having traction in the manner hereinbefore described.

The clutch devices between the helical gears 1, 1ª are shown as frictional devices; such clutch devices may have one or more friction surfaces, and the clutch members may be of any desired shape or contour. In Fig. 1, the friction disk F is flat. In Fig. 2 the opposed clutch faces are conical and the friction member F' is correspondingly shaped; in Fig. 3 the friction surfaces resemble a multiple cone, and the friction member F² is correspondingly shaped. I do not, however, consider the invention limited to the employment of friction clutch devices.

I claim:

1. In a differential gear; a pair of axle sections, opposed helical driving gears on the adjacent ends of said sections, opposed helical pinions meshing with said helical gears, a frictional element between the helical gears, and compensating gearing for driving said helical pinions; the teeth of the said helical pinions and helical gears being so angularly disposed that the helical gears are pressed toward each other to engage the frictional element during forward driving.

2. In a differential gear; a pair of axle sections, opposed helical driving gears on the adjacent ends of said sections, opposed helical pinions meshing with said helical gears; compensating gearing for rotating the helical pinions; and clutch means between the said helical gears; the teeth of the said helical pinions and helical gears being so angularly disposed that the helical gears are pressed toward each other during forward driving.

3. In a differential gear; a housing, a pair of aligned axle sections, similar opposed helical gears in said housing on the adjacent ends of said sections, opposed helical pinions rotatably mounted in said housing and meshing with said helical gears, a driving shaft, compensating gearing driven by said driving shaft for rotating said helical pinions, and frictional clutch means between said helical gears adapted to be engaged by relative endwise movement of said gears; said helical pinions and helical gears having angular teeth so disposed that the said gears are caused to press toward each other during forward driving.

4. In a differential gear; a pair of axle sections, opposed helical driving gears on the adjacent ends of said sections, opposed helical pinions meshing with said helical gears, opposed bevel gears connected with the helical pinions, compensating gears interposed between and meshing with said bevel gears, means for orbitally rotating the compensating gears, and clutch means for interengaging said helical gears; the teeth of the said helical pinions and helical gears being so angularly disposed that the helical gears are caused to press toward each other and engage said clutch means during forward driving.

5. In a differential gear; a pair of axle sections, opposed helical driving gears on the adjacent ends of said sections, opposed helical pinions meshing with said helical gears, opposed bevel gears connected with the helical pinions, compensating gears interposed between and meshing with said bevel gears, and clutch means between the said helical gears, the teeth of the said helical pinions and helical gears being so angularly disposed that the helical gears are caused to press toward each other and engage the clutch means during forward driving.

6. In a differential gear; a pair of axle sections, opposed helical driving gears on the adjacent ends of said sections, opposed helical pinions meshing with said helical gears; the teeth of the helical pinions and helical gears being so disposed that the helical gears will be caused to press toward each other during forward driving; opposed bevel gears connected with the helical pinions, a set of compensating gears interposed between said bevel gears, means for orbitally rotating the compensating gears, and clutch means interposed between the said helical gears.

7. In a differential gear; a housing, a pair of aligned axle sections, similar opposed helical driving gears in said housing on the adjacent ends of said sections, opposed helical pinions rotatably mounted in said housing and meshing with said helical gears, clutch devices between said helical gears, said helical pinions and helical gears having angular teeth whereby the helical gears are caused to press toward each other and engage the clutch devices during forward driving; opposed bevel gears connected with the helical pinions, a set of compensating gears interposed between said bevel gears and meshing therewith, a driving shaft, and means actuated by said driving shaft for orbitally rotating the set of compensating gears.

8. In a differential gear; a pair of axle sections, opposed helical driving gears on the adjacent ends of said sections a clutch element between the gears, opposed helical pinions meshing with said helical gears, and compensating gearing for driving said helical pinions mounted between said pinions, the teeth of the said helical pinions and helical gears being so angularly disposed that the helical gears will press toward each other and engage the clutch element during forward driving.

9. In a differential gear; a housing, a pair of aligned axle sections, similar opposed helical driving gears in said housing on the adjacent ends of said sections, opposed helical pinions rotatably mounted in said housing and meshing with said helical gears, a driving shaft, compensating gearing driven by said driving shaft for rotating said helical pinions; said compensating gears being mounted between said pinions; and clutch devices between said helical gears; said helical pinions and helical gears having angular teeth so disposed that said gears are caused to press toward each other during forward driving.

10. In a differential gear; a pair of axle sections, opposed helical driving gears on the adjacent ends of said sections, a jack shaft, opposed helical pinions mounted on said jack shaft and meshing with said helical gears; the teeth of the said helical pinions and helical gears being so angularly disposed that the helical gears are caused to press toward each other during forward driving; opposed bevel gears connected with the helical pinions, compensating gears interposed between and meshing with said bevel gears, means for orbitally rotating the compensating gears, and clutch means whereby the said helical gears will be interengaged during forward driving.

11. In a differential gear, a housing, a pair of aligned axle sections, similar opposed helical driving gears in said housing on the adjacent ends of said sections, a jack shaft parallel with said sections, opposed helical pinions rotatably mounted on said jack shaft and meshing with said helical gears; said helical pinions and helical gears having angular teeth so disposed that the helical gears will be caused to press toward each other during forward driving; opposed bevel gears connected with the helical pinions, a set of compensating gears interposed between said bevel gears and meshing therewith, a driving shaft, means driven by said driving shaft for orbitally rotating the set of compensating gears, and clutch devices between said helical gears.

In testimony that I claim the foregoing as my own, I affix my signature.

DAVID E. ROSS.